US006568608B2

(12) United States Patent
Sirkin

(10) Patent No.: US 6,568,608 B2
(45) Date of Patent: May 27, 2003

(54) WATER SPRINKLER HEAD WITH INTEGRAL OFF-ON WATER FLOW CONTROL VALVE AND ADAPTIVE FITTINGS THEREFOR

(76) Inventor: Theodore Sirkin, 23262 Oxnard St., Woodland Hills, CA (US) 91367

( * ) Notice: Subject to any disclaimer, the term of this patent is extended or adjusted under 35 U.S.C. 154(b) by 0 days.

(21) Appl. No.: 09/755,793

(22) Filed: Jan. 5, 2001

(65) Prior Publication Data

US 2002/0088878 A1 Jul. 11, 2002

(51) Int. Cl.[7] ........................ A01G 25/06; B05B 15/06; B05B 15/10; F02M 59/20

(52) U.S. Cl. ........................ 239/569; 239/200; 239/201; 239/203; 239/204; 239/205; 239/533.6

(58) Field of Search ................................ 239/569, 200, 239/201, 203, 204, 533.6, 205; 137/68.1, 71, 887; 251/211

(56) References Cited

U.S. PATENT DOCUMENTS 581,358 A 4/1897 Mayer
1,059,753 A 4/1913 O'Brien et al.
1,127,683 A 2/1915 Schwartz
1,272,263 A 7/1918 Hooker
1,412,468 A 4/1922 Jeanmaire
1,584,199 A 5/1926 Stroebel
1,639,162 A 8/1927 Brooks
2,285,689 A 6/1942 Tullis
2,810,607 A 10/1957 Hruby, Jr.
2,899,978 A 8/1959 Hruby, Jr.
2,902,708 A 9/1959 Riley
2,963,264 A 12/1960 Hruby, Jr.
3,342,423 A 9/1967 Hruby, Jr. et al.
3,517,886 A 6/1970 Dyck
3,703,990 A * 11/1972 Erickson ...................... 239/11
3,777,777 A * 12/1973 Katchka .................. 137/454.6
3,840,208 A 10/1974 James
4,516,724 A 5/1985 Hellman
4,806,258 A * 2/1989 Duncan ...................... 210/423
4,812,082 A * 3/1989 Cooper ........................ 405/36
4,813,605 A 3/1989 Fuller
4,815,566 A 3/1989 Caruso et al.
4,819,872 A 4/1989 Rosenberg
4,848,661 A * 7/1989 Palmer et al. .............. 239/204
4,852,802 A * 8/1989 Iggulden et al. .............. 239/70
5,335,857 A * 8/1994 Hagon ........................ 239/204
5,360,172 A 11/1994 Wang
5,526,845 A 6/1996 Manos
5,558,113 A 9/1996 Casteel et al.
5,836,517 A 11/1998 Burns et al.
5,937,451 A 8/1999 Mihara
6,042,015 A 3/2000 Eveleigh et al.
6,056,155 A 5/2000 Byerly et al.
6,073,863 A 6/2000 Wang

* cited by examiner

*Primary Examiner*—Michael Mar
*Assistant Examiner*—Davis Hwu
(74) *Attorney, Agent, or Firm*—Robert J. Schaap

(57) ABSTRACT

A sprinkler head assembly comprised of a base located at the upper end of a riser tube and which base carries a screen allowing for distribution of water. In accordance with the present invention, a control valve is located directly at the sprinkler head assembly. In one embodiment, the sprinkler head assembly may constitute a shrub or stationary head connected to the upper end of the riser tube. In this embodiment, the control valve would be preferably located in the body of the base of the stationary sprinkler head. In another embodiment, the sprinkler head assembly constitutes a pop-up sprinkler head and the control valve would be located in the pop-up shaft forming part of that sprinkler head. In still another embodiment of the invention, a retrofit coupling or adapter may be provided and which would be located between a riser tube and a sprinkler head forming part of that assembly. In this case, the adaptive coupling would include the control valve. In each case, water flow to the sprinkler head assembly may be temporarily interrupted to allow cleaning and repair or replacement of the sprinkler head from a point upstream of the insert, but yet in close proximity to that sprinkler head assembly.

47 Claims, 7 Drawing Sheets

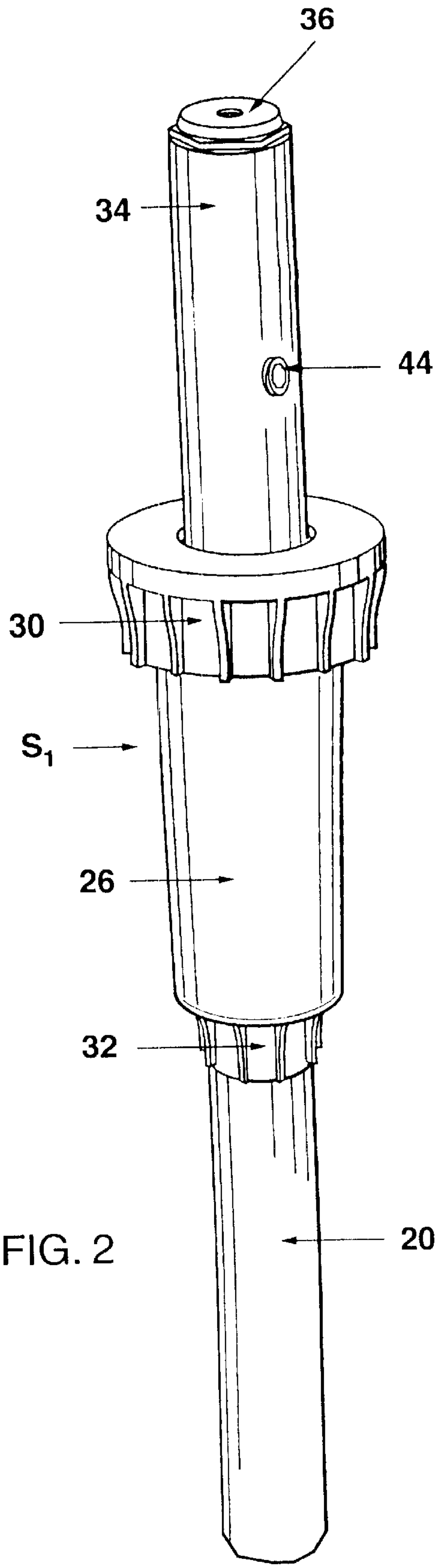
FIG. 2
FIG. 3
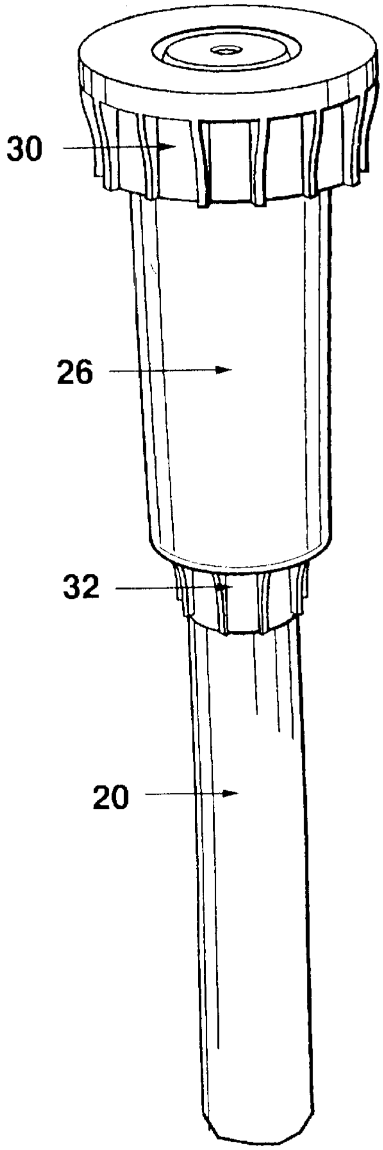

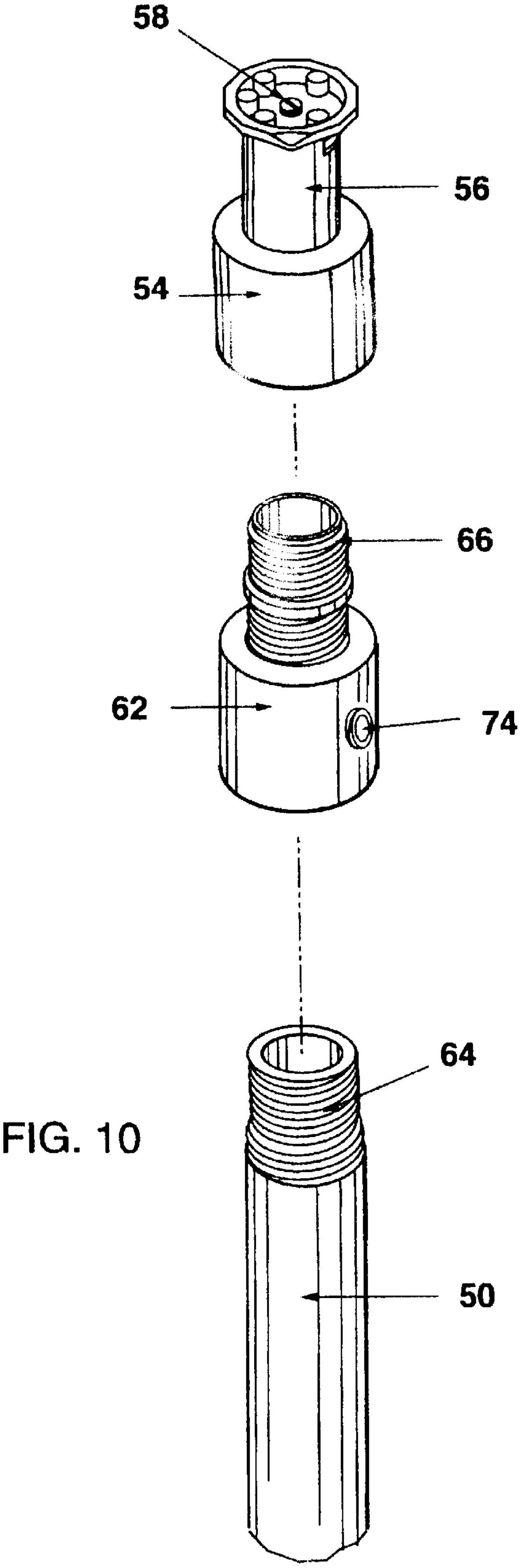
FIG. 10
FIG. 11
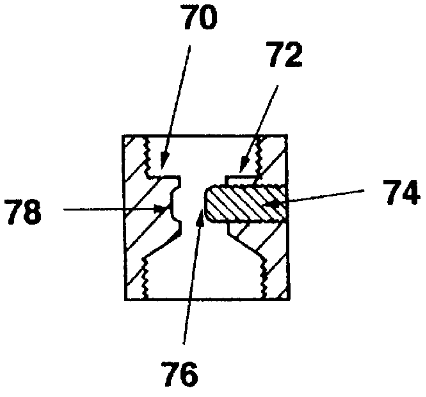

WATER SPRINKLER HEAD WITH INTEGRAL OFF-ON WATER FLOW CONTROL VALVE AND ADAPTIVE FITTINGS THEREFOR

BACKGROUND OF THE INVENTION

1. Field of the Invention

This invention relates in general to certain new and useful improvements in water sprinkler heads and, more particularly, to an improved sprinkler head which allows for turning water flow off and on directly at the sprinkler head to enable removal of the spray distributor, or disc, or so-called "insert" and, in some cases, the filtering screen underlying the insert.

2. Brief Description of Related Art

Lawn and garden sprinkler systems are common in many parts of the United States and in many other countries where the climate is hot and grass or other vegetation would readily perish if not watered either physically by one or more individuals or through the aid of an irrigation sprinkler system. Sprinkler systems are also more frequently used in periods in which the climate is particularly hot during certain periods of the year.

All irrigation sprinkler systems are connected to a water source, such as a municipal water supply, and contain relatively shallow underground pipes which extend under the ground surface and contain sprinkler heads projecting upwardly from these underground pipes in order to apply water to selected areas of a lawn or garden to be irrigated. Typically, in an average yard or lawn area, a sprinkler head would be designed to apply water to an area of, e.g. approximately four to fifteen feet in diameter, or more, depending upon the water pressure, the type of sprinkler head which is employed and the area which needs to be watered. As a rough average, approximately twelve to twenty-five sprinkler heads are used to irrigate an average yard or lawn, depending upon such factors as valve size, type of head employed, water pressure in the area, and the like.

The water sprinkler system normally employed uses a plurality of underground pipes, as aforesaid, and which are connected to a source of water, as aforesaid, and which is controlled by a master control valve at the head of the sprinkler system. However, if a master control valve is not actually used, the water meter effectively operates as that control valve.

The water which passes through the underground pipes and exits from the sprinkler heads is usually controlled by a time clock or controller and which is frequently located at a point remote from the actual irrigated area. Moreover, each of the sprinkler valves would be governed by that master processor or master clock. The master clock and associated processor cause the opening of a valve, frequently referred to as a "RCV" (remote central valve) and which is also frequently located at a remote site and which allows for water flow through the various sprinkler heads. The RCV and the time clock are connected electrically. The same master clock and processor will cause a cessation of the water flow through the remote control valve after a predetermined period of time which is programmed into the clock or processor.

Water lines which carry water delivered from the municipal water source will frequently carry small particles of debris, such as dirt particles, small rocks and pebbles and the like. This debris interferes with a proper water flow and the sprinkler heads must frequently be cleaned in order to enable a proper spray, that is, in a proper distribution of water, and water application to the ground surface. Generally, all of the major sprinkler head manufacturers produce sprinkler heads which contain some type of screen mechanism in order to filter out this debris carried in the water line. However, inasmuch as the screen collects this debris contained in the delivered water, the screen necessarily requires cleaning.

In order to clean the screen of a head or the sprinkler insert, or in order to replace the head, it would be more convenient to open or close a valve in the field where the problem exists rather than walk to the location of the clock or electronic controller or to the remote control valve. At present, there is nothing which provides for opening and closing a valve at the sprinkler head. This is particularly the case where the project having the irrigated land is of a large size and where the location of the valve or the controller may be at a somewhat remote point from the problem sprinkler head.

There are two types of heads generally in commercial use and which are employed within most irrigation systems. Those heads which appear in lawns are almost always pop-up type sprinkler heads so that they do not interfere with mowing of the lawn or other cleaning of the lawn. The second type of head which is used and, particularly, in shrubbery and so-called ground cover areas, is the stationary type known as a "shrub head" and which usually extends about an inch to as much as six inches, usually three or four inches, above a ground surface. In each of these cases, at the top of the sprinkler head is a part called an "insert" and which is generally screwed into the top of the sprinkler head. The insert is the part which contains the orifice from which the water exits. Inserts are constructed in various configurations, usually full inserts, or one-half or one-fourth inserts, bubblers, etc. The exact form of the insert is not critical in connection with the present invention, although access to that insert is important in the invention.

When it is necessary to clean or repair the sprinkler head, or any part thereof, e.g., the screen below the head, it is almost always necessary to cut-off water flow to that head. Otherwise, when the insert is removed from the head, water will exit usually in a substantial volume, since a removed insert presents the point of least resistance to water flow under pressure throughout the entire irrigation system.

In order to remove the water emitting nozzle or insert from the sprinkler head, it is necessary to cut-off the flow of water to the sprinkler head. Upon determining that the area near a sprinkler head is not receiving sufficient water, the gardener or maintenance personnel must turn on the RCV either at the time clock or manually open the RCV and observe the water that is actually being emitted from the various sprinkler heads in a certain locale. At that point, the gardener or maintenance personnel must then walk to the master valve or to the RCV or to the controller, turn off the water valve, controller or RCV, and walk back to the sprinkler head for removing the sprinkler emitting disc or so-called "insert" from the sprinkler head and allow for cleaning thereof.

Prior to insertion of the water emitting disc back into the sprinkler head, it is necessary to flush water from the sprinkler head itself. Consequently, and in order to perform the flushing operation, the gardener or irrigation personnel must then walk back to the master valve or controller, turn on the master valve or controller, and allow for flushing for several seconds or minutes. Naturally, the same personnel must be present at the flushing of the water line during the flushing operation. Thereafter, the same maintenance personnel then walks back to the master valve or controller, turns off the master valve and again returns to the particular sprinkler head which is being cleaned in order to insert the spray emitting disc. Following this, the same maintenance personnel must walk back to the master valve or controller in order to turn on the master valve, or RCV or controller and return to the head to be sure that it is now functioning properly and make any necessary adjustments to the water flow and/or direction of the spray.

It can be observed that the amount of the personnel hours lost in the pure physical act of walking back and forth can be quite substantial and necessarily adds to the cost of an irrigation bill from the maintenance personnel or the like. Moreover, it consumes a substantial amount of effort and, in some cases, frequently results in malfunctioning sprinkler heads not being cleaned and repaired as frequently as they would otherwise be repaired or cleaned.

In addition to the foregoing, pop-up sprinkler heads are much more complicated in their construction than are the so-called "shrub heads". The pop-up heads entail moving parts and which require water pressure to force the heads upwardly over the ground surface in order to properly emit the water spray to the ground surface. Other than the very top of the head, pop-up heads are completely buried in the ground making them more difficult to service. However, for the proper operation of the pop-up heads, the dirt and debris must again be frequently cleaned from the spray emitting orifice.

Almost all of the commercially available sprinkler heads have a flow control feature. This flow control feature resides in the form of a small screw located at the very top of the insert which can regulate the flow of water outwardly of the head. By tightening the screw down to the point where there is no water flow, cessation of the water flow has effectively been achieved. However, in each of these cases, one could not remove the head or the insert of the head since there is no upstream point in proximity to the sprinkler head to cut-off water flow for a temporary period.

There are numerous sprinkler heads reported in the literature and available in the prior art. For example, U.S. Pat. No. 2,360,203 to Fox, U.S. Pat. No. 1,639,162 to Brooks, U.S. Pat. No. 1,681,719 to Baldwin, and U.S. Pat. No. 3,263,930 to Friedmann, et al, disclose various types of pop-up heads. Each of these sprinklers may contain a feature to control the spray and, to some extent, operate as a type of flow control. However, none of these sprinkler head types include any means to stop water flow to the insert at a point upstream from the sprinkler head. In addition, U.S. Pat. No. 1,078,543 to Hadden discloses a sprinkler head having a type of head position adjustment using a set screw. However, and here again, there is no means to cut-off water flow to the head at a point adjacent to and upstream of the sprinkler head.

U.S. Pat. No. 4,282,508 to Roberts includes an internal adjustment screw, although again it would not permit opening and closing of the sprinkler head at a point upstream of the sprinkler head in order to permit removal of the insert without turning off water at a remote source. U.S. Pat. No. 3,763,512 to Valihora discloses a beacon recovery system.

It would therefore be desirable to provide some means to shut off water flow and again turn on water flow to a sprinkler head through manual actuation at the sprinkler head in a position such that an insert at the sprinkler head may be removed and/or the sprinkler head otherwise replaced without the need of walking to a remote site or operating in conjunction with personnel at a remote site in order to clean or repair that sprinkler head or its underlying screen. In other words, it would be desirable to be able to control the flow of water to a sprinkler head from a point upstream of the sprinkler head, but in very close proximity to the sprinkler head.

OBJECTS OF THE INVENTION

It is, therefore, one of the primary objects of the present invention to provide a sprinkler head which allows for cessation and re-initiation of water flow to a sprinkler head from a point upstream of the insert of the sprinkler head, but yet in close proximity to the insert of the sprinkler head.

It is another object of the present invention to provide a unique water sprinkler head of the type stated which allows for cleaning, replacement and/or repair of the sprinkler head without walking to a remote site from the sprinkler head or operating in conjunction with other personnel at a remote site to control water flow to that sprinkler head.

It is a further object of the present invention to provide a unique water sprinkler head of the type stated which includes an internal valve installed in the head which would allow personnel to cut-off water flow to and re-allow water flow to that sprinkler head by simple manual actuation at the sprinkler head.

It is an additional object of the present invention to provide a unique water sprinkler head of the type stated which allows for cleaning and/or repair of a sprinkler head both efficiently and conveniently without the need for extra or other types of tools and which resides in the feature of a simple valve construction integrated into the sprinkler head.

It is still another salient object of the present invention to provide a unique water sprinkler head of the type stated which can be constructed at a relatively low cost and which is highly efficient in operation.

It is yet another object of the present invention to provide a method of turning water flow off and re-initiating water flow to a sprinkler head from a point in close proximity to a sprinkler head in order to allow for repair, replacement and/or maintenance of the sprinkler head without interrupting water flow to an entire sprinkler system.

It is still another object of the present invention to provide a method of using a retrofit device in existing sprinkler systems to employ a modified sprinkler fitting upstream of the sprinkler head and which would incorporate an internal valve which allows personnel to cut off water flow and to re-establish water flow to the sprinkler by simple manual actuation. Moreover, this actuation occurs directly at the sprinkler head assembly at a point just below the sprinkler head itself.

With the above and other objects in view, my invention resides in the novel features of form, construction, arrangement and combination of parts and components presently described and pointed out in the claims.

SUMMARY OF THE INVENTION

The present invention resides in a novel sprinkler head which allows for shutting off water to the sprinkler head without shutting down the water at an origination point in an entire sprinkler system or segment of that sprinkler system. The sprinkler head is constructed so that the water flow may be cut-off and reinitiated upstream of the water exit location in that sprinkler head and which allows for repair, replacement and/or cleaning of the sprinkler head.

Two versions of the novel sprinkler head of the invention are available and one version resides in a shrub type sprinkler head and the second in a pop-up type sprinkler head. Moreover, the invention allows for incorporation of this water flow control principle in both new sprinkler head construction and in a retrofit device which may be added upstream to existing sprinkler heads.

In one of the important facets of the present invention, the control valve which is located directly at the sprinkler head is preferably integral with the sprinkler head. In broader terms, it is a component part of the sprinkler head assembly. In addition, this component may adopt the form of an adaptive fitting which could be located between the actual head and the riser tube. In this case, the adaptive fitting would become the retrofit device for controlling the water flow directly to the sprinkler head.

In substance, there are essentially four ways in which a control valve can become integral with the sprinkler head assembly and that is by installation in a riser tube or otherwise installation in the body of the sprinkler head. Thirdly, the control valve could be located in an adaptive fitting which is disposed between the sprinkler head and the riser tube. Finally, the control valve could be located in the pop-up shaft forming part of the pop-up sprinkler head.

In the case of the shrub head, that is one which extends above a ground surface by a limited distance and is fixed in that position, a small gate valve could be installed into the riser pipe and in a position upstream of that sprinkler head. In this way, upon shutting off the gate valve below the sprinkler head, cleaning of the screen or the insert part of the head can be accomplished readily and simply. This gate valve could be closed to remove the insert and then opened a small amount so as to flush out water from the riser and the head and then again closed off right at the sprinkler head so that the insert could be reinstalled without water saturation of maintenance personnel.

The problem with the above-identified approach is that it would be more costly to both install and to provide for a gate valve installation with the sprinkler head. Moreover, they would be unsightly and even invite vandalism. In addition, these gate valves would often be in an underground location and unserviceable as a result of corrosion. Consequently, use of a gate valve would not be desirable.

The present invention thereby provides a device which can be located as a part of the riser piping immediately upstream of a shrub sprinkler head or a part of adaptive fitting as part of a retrofit application, or part of the shrub sprinkler head itself, or located in the pop-up shaft of a pop-up sprinkler. For the stationary sprinkler heads, that is, the so-called shrub sprinkler heads, the device can be configured both for new sprinkler heads and in a retrofit arrangement, as aforesaid. In the case of a new riser sprinkler head construction, a small off/on control valve can be installed in a position within the sprinkler head upstream to the actual insert of the sprinkler head. This small valve arrangement would cut-off the water flow prior to the insert so that cleaning and flushing may be accomplished easily and with little mechanical involvement and, certainly, without the need for travel back and forth to the water source.

In a second embodiment of the invention in which the small valve construction may be employed as a retrofit arrangement in a stationary sprinkler head, an adaptive fitting with a small stub pipe or a modified connector coupling having an internal bore coaxial with that of the riser pipe would be installed at the riser pipe, but yet in a position upstream of the sprinkler head. This again would allow for off/on control of water flow to the sprinkler head at the head or area needing service.

In the case of a pop-up sprinkler head, the same off/on valve arrangement would be incorporated into the pop-up shaft. In each case, an adapter arrangement would be used in the sprinkler head. Inasmuch as most pop-up shafts have a relatively thin wall construction, it will be necessary to increase the wall thickness at a point below the screen in order to accommodate an off/on control valve.

In the case of the present invention, the sprinkler head, including all of the components, such as the body, the screen and the insert, are referred to as a sprinkler head assembly. In the case of the pop-up sprinkler head, the pop-up shaft is part of this assembly. In many cases, the riser tube is also deemed to be part of the sprinkler head assembly. In all cases, and in this respect, the off/on control valve, which is integral with the sprinkler head assembly, would be incorporated in the pop-up shaft, the riser tube or the body of the sprinkler head or otherwise even a coupling fitted between the riser tube and the sprinkler head.

This invention possesses many other advantages and has other purposes which may be made more clearly apparent from a consideration of the forms in which it may be embodied. These forms are shown in the drawings forming a part of and accompanying the present specification. They will now be described in detail for purposes of illustrating the general principles of the invention. However, it is to be understood that the following detailed description and the accompanying drawings are not to be taken in a limiting sense.

BRIEF DESCRIPTION OF THE DRAWINGS

Figure 1:
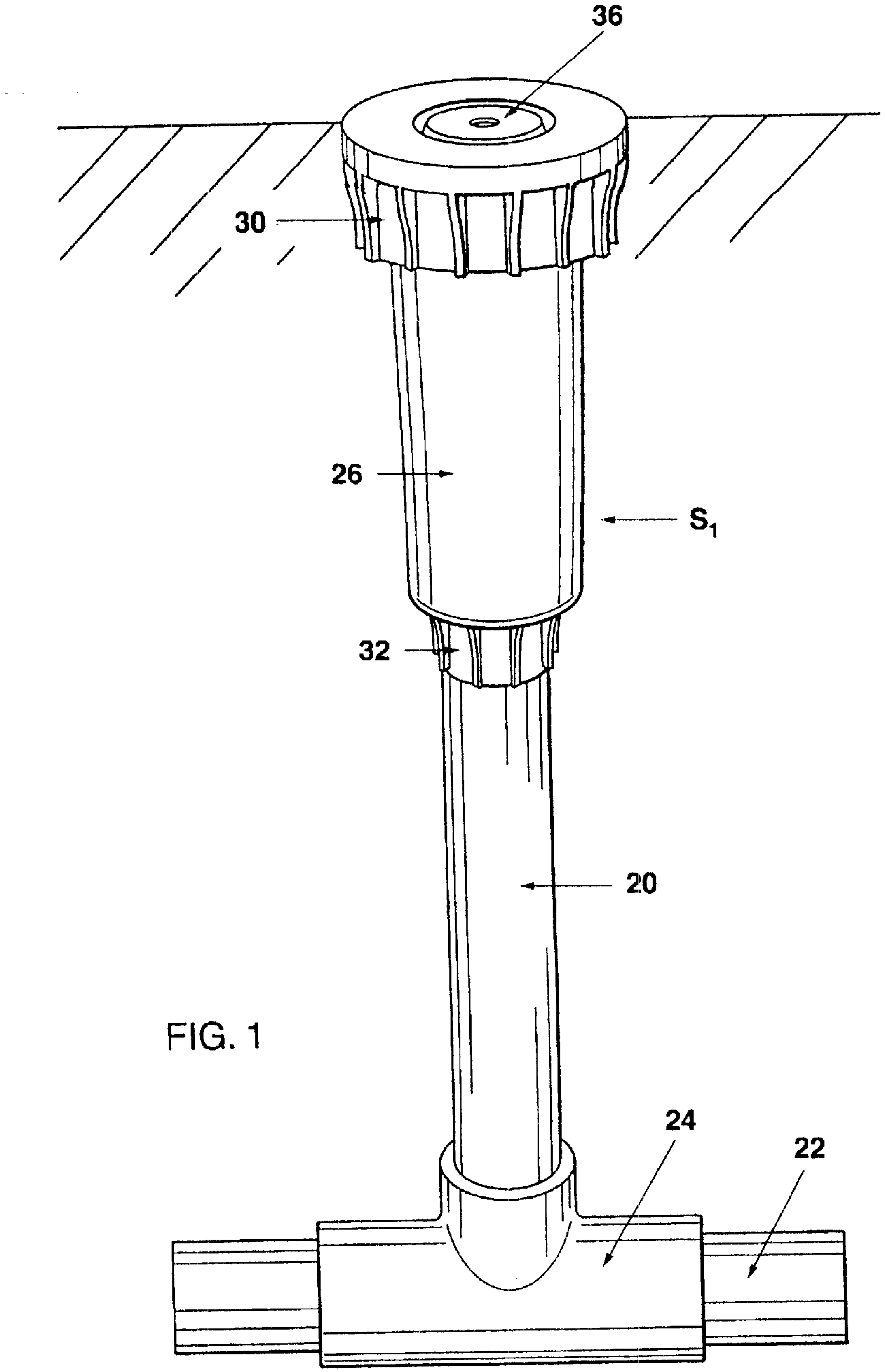
Figure 4:
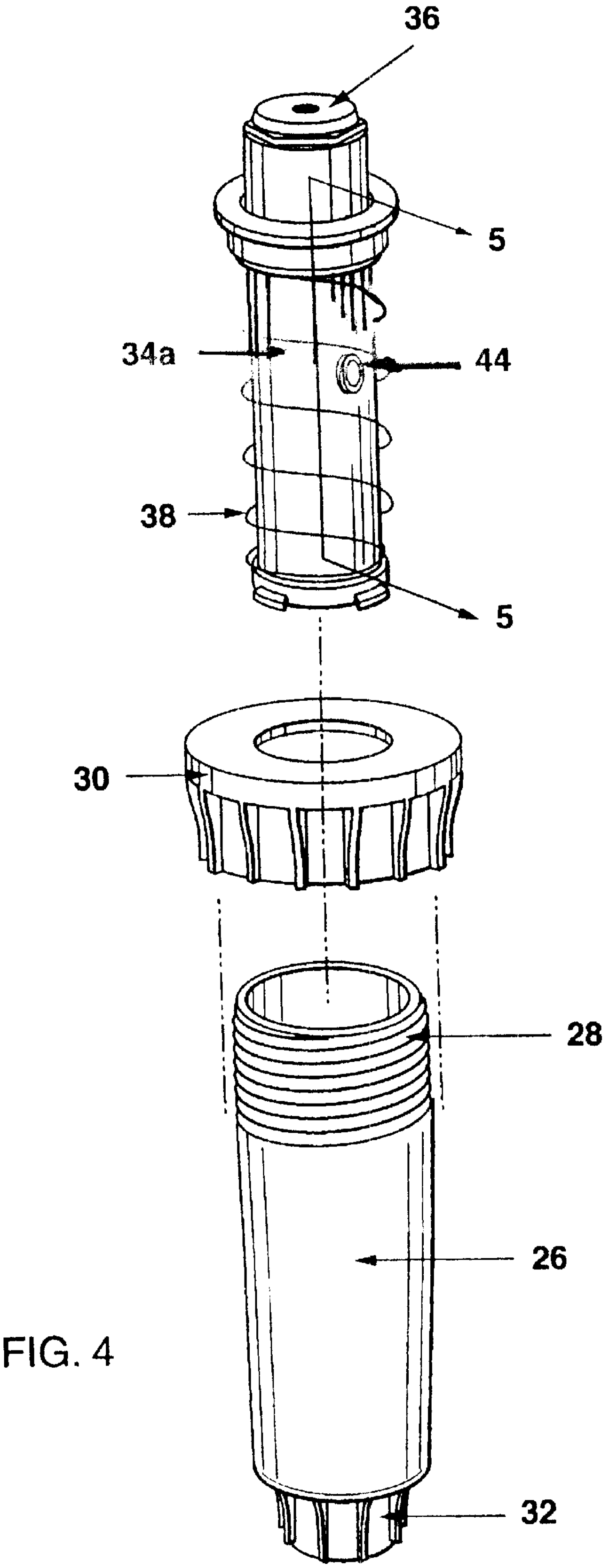
Figure 5:
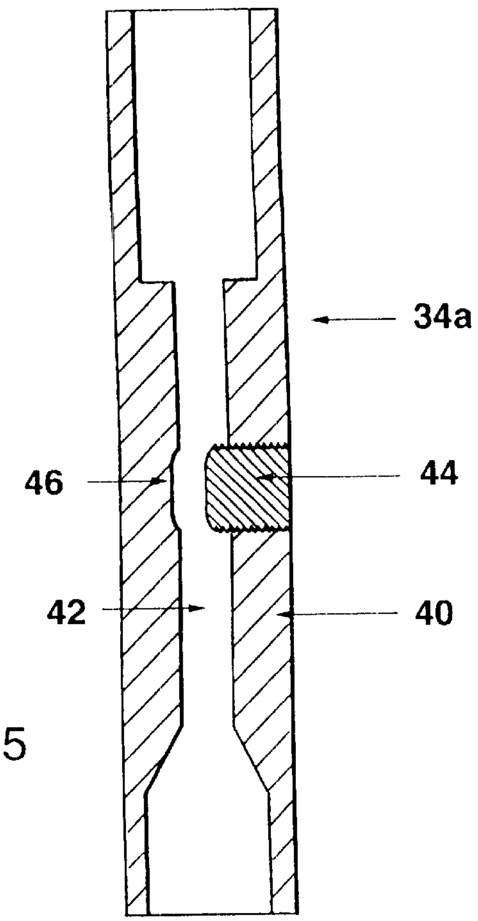
Figure 6:
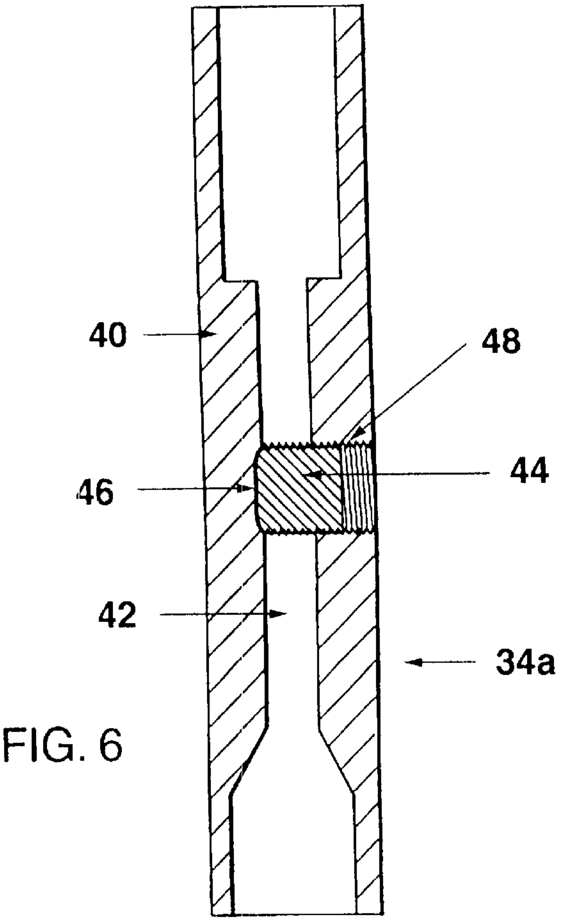
Figure 7:
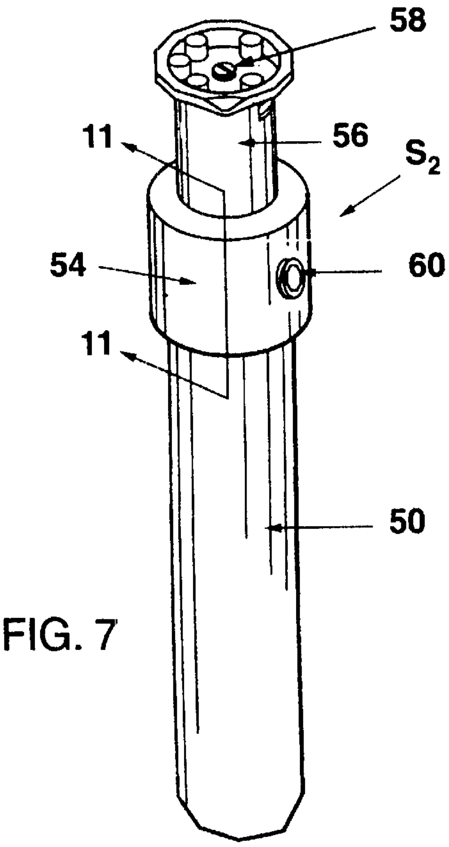
Figure 9:
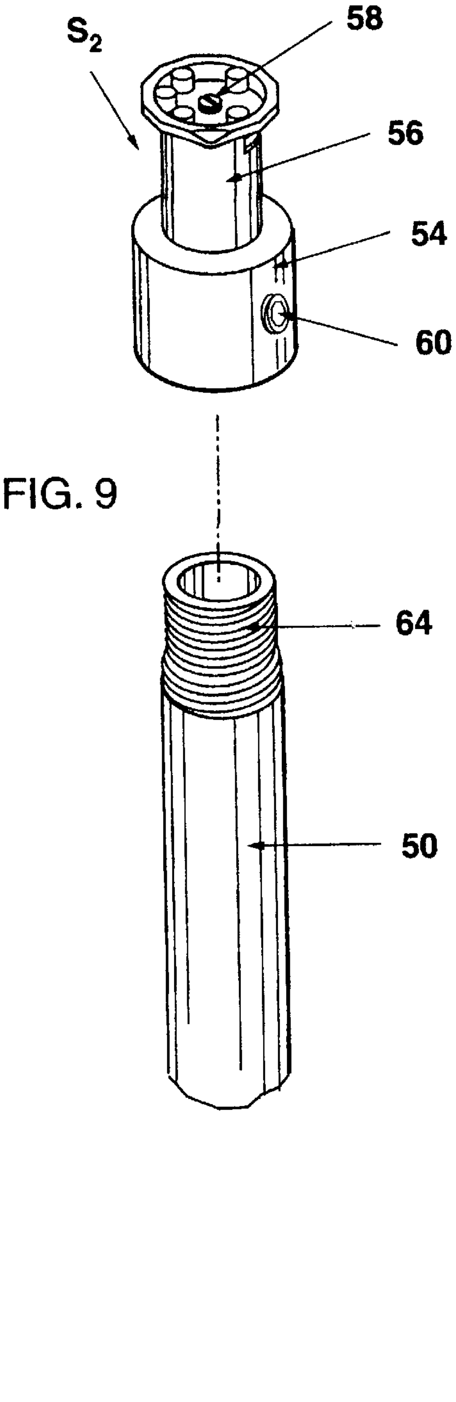
Figure 8:
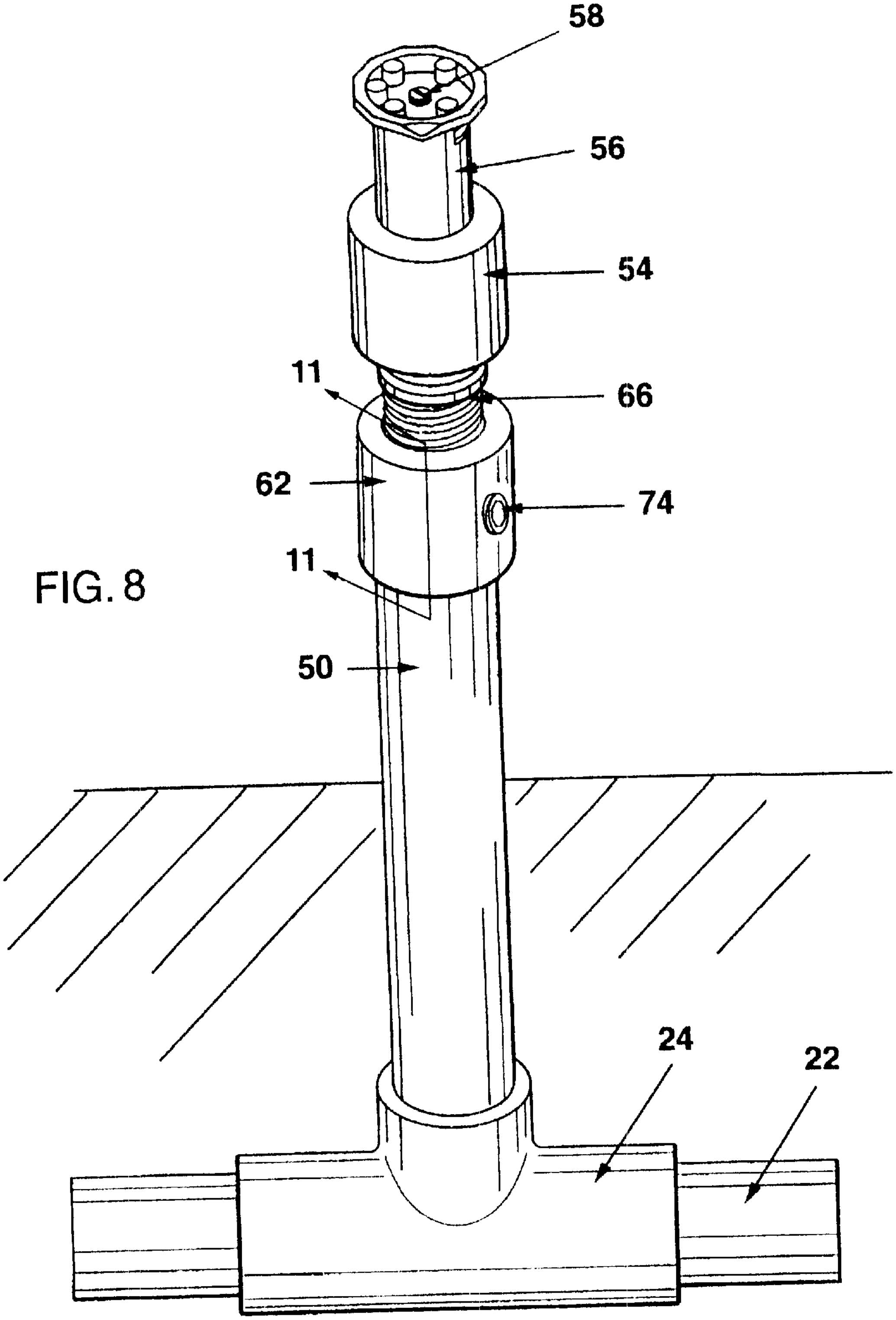

Having thus described the invention in general terms, reference will now be made to the accompanying drawings in which:

FIG. 1 is a perspective view of a pop-up sprinkler head constructed in accordance with, or having a control valve arrangement incorporated therein, in accordance with the present invention;

FIG. 2 is a perspective view of a typical sprinkler head of FIG. 1 with the pop-up shaft extended above the cap of the sprinkler head;

FIG. 3 is a perspective view, similar to FIG. 1, and showing retraction of the pop-up shaft back into the sprinkler head;

FIG. 4 is an exploded perspective view showing an arrangement of certain of the components in the pop-up sprinkler head in accordance with the present invention;

FIG. 5 is a vertical sectional view showing a portion of a valve in the sprinkler head of FIGS. 1–4, essentially taken through the pop-up shaft thereof at line 5–5 thereof, and showing the off/on valve in an opened position;

FIG. 6 is a vertical sectional view, similar to FIG. 5, and showing the valve in a valve closed position;

FIG. 7 is a perspective view of a shrub head provided with the valve component of the present invention and showing the shrub head extending into a portion of a ground surface;

FIG. 8 is a perspective view showing the incorporation of a retrofit coupling into a riser pipe and which is, in turn, provided with a shrub head in accordance with the present invention;

FIG. 9 is an exploded perspective view showing an arrangement of a shrub head having the valve assembly of the present invention incorporated in the body thereof with respect to a riser pipe;

FIG. 10 is an exploded perspective view of the unassembled components in which an adaptive fitting containing the valve assembly of the invention is interposed between a shrub head and a riser pipe; and FIG. 11 is a sectional view taken through a portion of the off/on valve assembly of the present invention, such as in arrangements of FIGS. 7–10 taken along line 11–11 of FIG. 7.

DETAILED DESCRIPTION OF A PREFERRED EMBODIMENT

Referring now in more detail and by reference characters to the drawings, which illustrate preferred embodiments of the present invention, FIG. 1 illustrates a pop-up sprinkler head $S_1$ constructed in accordance with and embodying the present invention and shown as being connected to the upper end of a riser pipe 20 and which is, in turn, supplied with water from the main subterranean irrigation line 22. Typically, the riser pipe 20 is connected to the irrigation line 22 through a T-fitting 24.

The sprinkler head Si is provided with an outer body 26 threadedly secured to the upper end of the riser pipe 20 and the body 26 is provided with a threaded end 28 for threadedly receiving a removable cap 30. The lower end of the body 26 is provided with an integral internally threaded fitting 32 for threaded attachment to the upper portion of the riser pipe 20.

Provided for vertically shiftable disposition within the body 26 is a pop-up shaft or so-called pop-up tube 34 (FIG. 2) and which is hollow in construction, as hereinafter described. At its upper end, the pop-up shaft 34 is provided with a removable threadedly secured insert 36. In all constructions, the body 26 and the cap 30, as well as the pop-up shaft 34, are of plastic construction. The insert 36 is frequently formed from a suitable metal or plastic, although any material of construction could be employed for this purpose.

In a conventional sprinkler, the pop-up shaft 34 would normally be of thin wall construction and would have an internal bore of generally consistent diameter throughout the length thereof. The pop-up shaft 34 is generally biased back into a retracted position with the body 26 by means of a spring 38 coiled about the pop-up shaft 34, as shown in FIG. 4.

Due to the fact that the pop-up shaft 34 is generally provided with a thin wall construction, it is necessary in accordance with the present invention to provide a slightly modified pop-up shaft 34*a,* as shown in FIGS. 5 and 6. This pop-up shaft 34*a* has a section 40 midway between its upper and lower ends which is of increased wall thickness and, hence, presents an internal bore 42 of somewhat reduced diameter. Located within the thickened wall section 40 is a valve plug 44 and which is capable of being threaded into and abutted against a recessed area 46 located within the thickened wall section 40. This valve plug 44 is threadedly fitted within a threaded section 48 formed in the thickened wall section 40, as best shown in FIG. 6. Thus, when the valve plug 44 is tightened against the recess 46, complete water flow through the bore of the pop-up shaft 34*a* is precluded. When the valve plug 44 is retracted to its opened position, as shown in FIG. 5, water flow from the lower end and through the upper end to the insert 36 is allowed.

The valve plug 44 is preferably conveniently provided with an elongate slot, or other tool receiving head, on its exterior surface in order to allow for adjustment through a simple screw driver or the like. However, any means for turning the valve plug may be employed in accordance with the present invention.

The wall thickness of the pop-up shaft 34 is increased, such that the water passageway 42 is roughly 3⁄16 to 1⁄4 inch in diameter. This modification increases the amount of plastic in order to allow for installation of the valve plug. In essentially all embodiments, it may be necessary to increase wall thickness in order to accommodate the small control valve of the present invention. In the case of the sprinkler head body, one portion of the body would have to be thickened so as to allow for the use of a shiftable plunger to control water flow. Clearly, the same holds true when the small end valve is located in riser tube. Even in the case of an adaptive fitting, which may be in the nature of a coupling, it is also necessary to provide a thickened wall section to allow for receipt of a shiftable plunger for control of water flow (FIG. 11).

In essence, the valve plug 44 can easily adopt the form of a 1⁄4 to 5⁄16 inch diameter set screw and when torqued against the recess, it will close off the passageway. In pop-up heads, the outer end of the set screw or valve plug is flush with the outer surface of the pop-up shaft when in the opened position. The inside end of the valve plug 44 is rounded so as to fit snugly within the recess 46, as shown in FIG. 5. In this way, this type of construction precludes water leaking past the plug 44 or out from the sides of the valve arrangement. The recess 46 actually precludes water moving up the duct 42 when in the off position.

It can also be observed that the pop-up sprinkler head construction $S_1$, as illustrated in FIGS. 1–6, allows for new sprinkler head construction with this invention. FIGS. 7 and 9 illustrate the arrangement of the valve assembly of the present invention incorporated in the body of a shrub head. FIGS. 8 and 10 illustrate a retrofit arrangement, in this case, in connection with a shrub head. In the case of a retrofit arrangement, whether with an above ground pop-up sprinkler head or with a shrub head, a coupling or some other form of adaptive fitting is interposed between the sprinkler head itself and the riser pipe. In like manner, and in the case of the pop-up sprinkler head, a substitute pop-up shaft or tube can be replaced for that existing in the conventional pop-up sprinkler head. This can be accomplished merely by removal of the cap 30, installation of the new pop-up shaft 34*a,* and re-threading the valve cap 30 back into its position, as shown in FIG. 1. FIGS. 7 and 9 illustrate a valve arrangement incorporated in the body of a shrub sprinkler head, as aforesaid. Thus, and referring in particular to FIGS. 7 and 9, it can be seen there is a shrub head $S_2$ having a body 54 and an upstanding insert 56. The insert is provided with an adjustment screw 58 at the top portion thereof. Moreover, the insert is actually threaded into the upper end of the body 54.

In this particular embodiment, there is provided a valve arrangement 60 which is incorporated into the body 54. This valve arrangement would be substantially similar to and operate in a manner substantially the same as that valve arrangement shown in FIGS. 5 and 6 and used in a pop-up tube. In FIG. 7, it can be observed that the base 54 of the sprinkler head $S_2$ is actually threaded onto the upper end of a riser pipe 50 and the latter of which would be connected to a T-fitting or an elbow on a subterranean pipe for delivery of water.

In this embodiment, it can be observed that the sprinkler head $S_2$, which is frequently referred to as a “shrub head”, is of a stationary type, that is, it does not include a pop-up shaft, but rather, contains no moving parts and is located a fixed distance above the ground surface.

FIGS. 8 and 10 illustrate an embodiment of the invention in which there is a coupling or adaptive fitting located between a riser pipe, such as the riser pipe 50, and a sprinkler head, such as a shrub type sprinkler head. In the previously described embodiments, the valve assembly forming part of the present invention was actually incorporated in the sprinkler head as an integral part thereof and would normally be provided as a new head construction. This is particularly true in the case of the shrub head in which the body of the shrub head is provided with the valve arrangement. In the case of the pop-up sprinkler head, the sprinkler head again could be provided as a new construction with a modified form of pop-up shaft therein.

In the embodiment of the invention which uses a coupling or adaptive fitting, as shown in FIGS. 8 and 10, a retrofit coupling 62 is provided and is threadedly secured to the upper end of a riser pipe 50. The coupling would be provided with an internally threaded lower end (not shown) for threaded securement to the upper end of the riser pipe. In like manner, the upper end of the retrofit coupling 62 would be internally threaded to receive a stub pipe 66 or in the case of an adaptive fitting would be externally threaded to receive the base 54. In this case, the coupling 62 or adapter is also provided with the valve arrangement of the present invention and which is also hereinafter described in more detail. This valve arrangement is also provided with a valve plug 74, similar to the plug 60, and which is again hereinafter described in more detail.

Secured to the upper end of the stub pipe 66 is a shrub head, such as that shrub head illustrated in FIG. 7, and which is similarly comprised of a body 54 and an insert 56 having an upper screen and adjustment screw 58 therewith.

FIG. 10 illustrates the components forming part of the retrofit assembly of FIG. 8 in an exploded view. Thus, and for this purpose, it can be seen that the sprinkler head having the body 54 is actually of a conventional design. In like manner, the riser pipe 50 is similarly of a conventional design and includes an upper threaded section 64 adapted to receive the internally threaded socket of the coupling 62 or adaptive fitting. Moreover, the stub pipe 66 will thereupon receive the sprinkler head having the base 54 thereof.

It should also be understood in accordance with the present invention that the valve arrangement could be actually incorporated in the riser pipe 50 itself. However, and although possible, that is not necessarily one of the preferred constructions in the present invention.

In all embodiments, the sprinkler head and the coupling thereof are highly effective, in that they permit cut-off and reinitiation of water flow to the insert which allows for maintenance personnel to clean and/or repair the sprinkler head without the need of operating in conjunction with another party or without traveling to a remote site for control of water flow.

In connection with the operation of the actual off/on valve, the coupling or adapter 62 having the valve arrangement is more fully illustrated in FIG. 11 of the drawings and comprises a slightly thickened section 72 in the wall construction of the element receiving the valve plug, such as the valve plug 74. Thus, this valve plug 74 is similar in operation and construction to the valve plug 44. Again, the valve plug 74 has an inner end 76 designed to fit against a recess 78 for tightly closing off water flow.

The configuration of the sprinkler head base of FIG. 9 could be designed as shown in FIGS. 7 and 9. In other words, the valve arrangement of FIG. 7 could be used in both of the arrangements of FIGS. 7 and 9. The same holds true of FIGS. 8 and 10.

In each of the above-identified embodiments of the invention, the off/on valve forming part of the sprinkler head, including both embodiments where the valve is in the sprinkler head base, or the pop-up shaft of a pop-up head, or located in a retrofitable coupling or adaptive fitting, are effective. All of these arrangements allow the valve to be in an upstream position with respect to the insert and, in most cases, the filtering screen and thereby allows the valve to be opened and closed so that the insert and screen can be removed without causing water spraying on the attendant personnel. Thus, the necessity of walking to a remote site for purposes of controlling flow to the sprinkler head is thereby completely eliminated. In this way, maintenance personnel can remove and clean the insert and the screen, if necessary, and can re-establish water flow in order to flush out the head and then replace the insert, all without the necessity of moving from the proximity of the sprinkler head.

Thus, there has been illustrated and described a unique and novel water sprinkler head arrangement with an off/on water flow control valve and which thereby fulfills all of the objects and advantages which have been sought. It should be understood that there will be many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by letters patent is:

1. A sprinkler head assembly having off/on water flow control for turning water of f and on at said sprinkler head assembly, without interrupting water flow to any adjacent sprinkler heads, said sprinkler head assembly comprising:

a) a generally upright tube which carries water from a subterranean water conduit;

b) a sprinkler head body at the upper end of the generally upright tube and at least one of said body and said tube having a generally upright duct in communication with said subterranean water conduit;

c) an insert located at said sprinkler head body for allowing a directionalized spray of water from the subterranean conduit through the sprinkler head; and d) off/on water flow control valve means comprising a manually actuable plug extending into said duct and being angularly located with respect to an axis of said duct for stopping water flow when the plug is in a first position in said duct such that it blocks water flow and reinitiating a flow of water to said sprinkler head assembly when said plug is in a second position which is shifted axially of said plug with respect to said first position and independently of a main control therefor, thereby allowing servicing of said sprinkler head assembly without the need of controlling water flow at the main control therefor or shutting off water flow to other sprinkler head assemblies receiving water from that subterranean water conduit.

2. The sprinkler head assembly of claim 1 further characterized in that said off/on control valve means is located in an upstream position with respect to said insert.

3. The sprinkler head assembly of claim 1 further characterized in that said off/on control valve means is located in one of a body of the sprinkler head, or in a sprinkler head pop-up shaft, in an adaptive attachment between the sprinkler head body and the generally upright tube, or in the upright tube itself and is in an upstream position with respect to said insert to thereby cut-off water flow before the insert.

4. The sprinkler head assembly of claim 3 further characterized in that said off/on control valve means is located in a base of a shrub type stationary sprinkler head.

5. The sprinkler head assembly of claim 3 further characterized in that said control valve means is in a pop-up shaft which forms part of a pop-up sprinkler head and carries said insert at its upper end thereof.

6. The sprinkler head assembly of claim 1 further characterized in that said plug extends into said duct passing through said sprinkler head assembly to block off water flow when said plug is introduced into said duct to block flow therethrough and allows water flow when said plug is shifted so that a portion thereof extends outwardly from said duct.

7. The sprinkler head assembly of claim 1 further characterized in that said plug is manually actuable and extends into said duct generally perpendicularly to a central axis of said duct for controlling water flow through said duct.

8. The sprinkler head assembly of claim 1 further characterized in that said plug is threaded for manually turning said plug to cause said plug to extend into said first position in said duct and retract outwardly from said second position in said duct.

9. The sprinkler head assembly of claim 8 further characterized in that a recess is formed at said duct and which recess has an axis of rotation generally perpendicular to a central axis of said duct and which is sized to receive an arcuately shaped end of said plug and which arcuately shaped end engages said recess when said plug is in said first position.

10. The sprinkler head assembly of claim 9 further characterized in that a tool receiving area is formed at an outer end of said plug to cause threaded turning of said plug into and out of said duct.

11. The sprinkler head assembly of claim 9 further characterized in that said plug has a diametrical size at least as large as that of the duct.

12. The sprinkler head assembly of claim 1 further characterized in that said plug extends into said duct generally perpendicularly to a central axis of said duct for controlling water flow through said duct.

13. The sprinkler head assembly of claim 1 further characterized in that said plug is threaded for manually turning said plug to cause said plug to extend into said first position in said duct and retract outwardly from said second position in said duct upon rotation thereof.

14. A sprinkler head assembly having a valve means to provide off/on water flow control at said sprinkler head assembly, said sprinkler head assembly comprising:

a) a manually actuable on/off water flow control valve means located in a position with respect to said sprinkler head assembly comprised of a body and generally vertically arranged tube having a duct extending through at least one of said body and tube for allowing and controlling flow of water to the sprinkler head assembly from a subterranean water sprinkler line; and b) a manually shiftable plug forming part of said valve means extending into said duct and being located with respect to a central axis of said duct at an angle sufficient to interrupt water flow when said plug is in a first position in said duct to block water flow and reinitiating water flow when said plug is retracted to a second position which is shifted with respect to said first position in said duct and independently of any main control for said water sprinkler line.

15. The sprinkler head assembly of claim 14 further characterized in that said generally vertically arranged tube is a riser tube and said sprinkler head body is attached to said riser tube which is used in or forms part of said sprinkler head assembly.

16. The sprinkler head assembly of claim 15 further characterized in that said off/on control valve is located in a section of said generally vertically arranged tube or said sprinkler head body and which has increased wall thickness in said duct in the region of said control valve with respect to the remaining portion of the duct.

17. A method for turning water flow off and reinitiating water flow at a sprinkler head and which eliminates the need to control water flow from a distantly located controller or sprinkler valve in order to enable cleaning or servicing or replacement of that sprinkler head, said method comprising:

a) installing an off/on water flow control valve means in a sprinkler head assembly connected to a subterranean water pipe which supplies water to said sprinkler head assembly;

b) manually actuating a valve plug forming part of a valve means to turn water flow off at said sprinkler head assembly by introducing said plug into a duct of said assembly and in a position located at an angle to said duct sufficient to block water flow passing through said duct;

c) allowing for cleaning or servicing of said sprinkler head assembly with little or no water flowing through said sprinkler head assembly without the need of shutting off water flow to other sprinkler heads receiving water flow from said subterranean water pipe; and d) retracting of said plug from at least a portion of the duct after cleaning or servicing to allow water to again flow through said sprinkler head assembly.

18. The method of claim 17 further characterized in that said method comprises locating said off/on control valve means in a position upstream with respect to an insert on said sprinkler head assembly.

19. The method of claim 17 further characterized in that said method allows for removal of said insert when water is turned off at said sprinkler head assembly, cleaning of the insert and re-introduction of the insert followed by initiating water flow again.

20. A sprinkler head assembly having off/on water flow control for turning water off and on at said sprinkler head assembly, without interrupting water flow to any adjacent sprinkler heads, said sprinkler head assembly comprising:

a) a generally upright tube having a duct which carries water from a subterranean water conduit;

b) a sprinkler head body at the upper end of the generally upright tube and having a duct in communication with said duct of said tube;

c) an insert located at said sprinkler head body for allowing a directionalized spray of water from the subterranean conduit through the duct of said sprinkler head; and d) off/on water flow control valve means comprising a manually actuable plug extending into one of said ducts and being generally perpendicularly located with respect to central axis of said one of said ducts, said plug being threaded to permit manually turning said plug causing said plug to extend into said one of said ducts in a first position therein for stopping water flow when the plug is in said first position and reinitiating a flow of water to said sprinkler head assembly when said plug is retracted outwardly with respect to said one of said ducts to a second position which is shifted with respect to said first position and independently of a main control therefor, thereby allowing servicing of said sprinkler head assembly without the need of controlling water flow at the main control therefor or shutting of f water flow to other sprinkler head assemblies receiving water from that subterranean water conduit.

21. The sprinkler head assembly of claim 20 further characterized in that a recess is formed at said one of said ducts having an axis generally perpendicular to the axis of that duct and receiving an arcuately shaped end of said plug which engages said recess when said plug is in said first position.

22. The sprinkler head assembly of claim 21 further characterized in that a tool receiving area is formed at an outer end of said plug to cause threaded turning of said plug into and out of said duct.

23. The sprinkle head assembly of claim 21 further characterized in that said plug has a diametrical size at least as large as that of said one of said ducts.

24. A sprinkler head assembly having a valve means to provide off/on water flow control at said sprinkler head assembly, said sprinkler head assembly comprising:

a) a manually actuable on/off water flow control valve means located in a position with respect to a generally vertically arranged tube with a duct extending through at least one of said tube or said sprinkler head assembly for allowing flow of water and for controlling the flow of water through the generally vertically arranged tube or the sprinkler head assembly from a subterranean water sprinkler line; and b) a manually actuable plug forming part of said valve means extending into said duct and being perpendicularly located with respect to a central axis of said duct, said plug being threaded to permit manually turning said plug for initiating water flow when said plug is retracted to a first position in said duct and stopping water flow when said plug is in a second position which is shifted with respect to said first position in said duct and independently of any main control for said water sprinkler system line.

25. The sprinkler head assembly of claim 24 further characterized in that a recess is formed at said duct having an axis generally perpendicular to the axis of said duct and receiving an arcuately shaped end of said plug which fully engages said recess when said plug is in said first position in said duct.

26. The sprinkler head assembly of claim 25 further characterized in that a tool receiving area is formed at an outer end of said plug to cause threaded turning of said plug into and out of said duct.

27. The sprinkler head assembly of claim 25 further characterized in that said plug has a diametrical size at least as large as that of the duct.

28. A method for turning water flow on and off at a sprinkler head and which eliminates the need to control water flow to that sprinkler head from a distantly located master controller or sprinkler valve in order to enable cleaning or servicing or replacement of that sprinkler head, said method comprising:

a) installing an off/on water flow control valve means in a sprinkler head assembly connected to subterranean water pipe which supplies water to said sprinkler head assembly;

b) manually rotating a threaded valve plug forming part of a valve means to turn water flow off at said sprinkler head assembly by introducing said plug into a duct of said assembly in a position generally perpendicular to a central axis of said duct so that the plug blocks water flow through said duct;

c) allowing for cleaning or servicing of said sprinkler head assembly with little or no water normally under pressure to flow through said duct of said assembly without the need of shutting off water flow to other sprinkler heads; and d) rotating said plug to retract said plug from at least a portion of the duct after cleaning or servicing to allow water flow to again commence through said sprinkler head assembly.

29. The method of claim 28 further characterized in that the method comprises causing an arcuately shaped end of said plug to extend into a recess formed at said duct having an axis generally perpendicular to a central axis of said duct and which is sized to receive an arcuately shaped end of said plug and which engages said recess when said plug is in said first position in said duct.

30. The method of claim 29 further characterized in that said method comprises inserting a plug in said duct having a diametrical size at least as large as that of the duct.

31. The method of claim 28 further characterized in that said method comprises manually engaging a tool receiving area formed at an outer end of said plug with a tool and causing a threadedly engaged turning of said plug into and out of said duct.

32. An improvement in a sprinkler head assembly comprised of a sprinkler head body and a generally upright tube which carries said body and delivers water from a subterranean water conduit through a duct therein, and which allows for turning water off and on at said sprinkler head assembly, without interrupting water flow to any adjacent sprinkler heads, said improvement comprising:

an off/on water flow control valve means comprising a manually actuable plug extending into said duct and being angularly located with respect to an axis of said duct for stopping water flow when the plug is in a first position in said duct such that it blocks water flow and reinitiates a flow of water through said sprinkler head assembly when said plug is retracted outwardly to a second position with respect to said first position and independently of a main control therefor, thereby allowing servicing of said sprinkler head assembly without the need of controlling water flow at the main control therefor or shutting off water flow to other sprinkler head assemblies receiving water from that same subterranean water conduit.

33. The improvement in the sprinkler head assembly of claim 32 further characterized in that said off/on control valve means is located in an upstream position with respect to an insert in said head assembly.

34. The improvement in the sprinkler head assembly of claim 32 further characterized in that said off/on control valve is located in said assembly in a region which has increased wall thickness in said duct in the region of said control valve with respect to the remaining portion of the duct.

35. The improvement in the sprinkler head assembly of claim 32 further characterized in that said plug is manually actuable and extends into said duct generally perpendicularly to a central axis of said duct for controlling water flow through said duct.

36. The improvement in the sprinkler head assembly of claim 35 further characterized in that said plug is threaded for allowing a manually turning of said plug to cause said plug to extend into said first position in said duct and retract outwardly from said second position in said duct.

37. The improvement in the sprinkler head assembly of claim 32 further characterized in that said plug is threaded for manually turning said plug to cause said plug to extend into said first position in said duct and retract outwardly from said second position in said duct upon rotation thereof.

38. The improvement in the sprinkler head assembly of claim 32 further characterized in that a recess is formed at said duct and which recess has an axis of rotation generally perpendicular to a central axis of said duct and which is sized to receive an arcuately shaped end of said plug and which arcuately shaped end engages said recess when said plug is in said first position in said duct.

39. The improvement in the sprinkler head assembly of claim 38 further characterized in that a tool receiving area is formed at an outer end of said plug to cause threaded turning of said plug into and out of said duct.

40. The improvement in the sprinkler head assembly of claim 38 further characterized in that said plug has a diametrical size at least as large as that of the duct.

41. An adaptive attachment for use with a sprinkler head assembly enabling the provision of off/on water flow control at said sprinkler head assembly, said adaptive attachment comprising:

a) a manually actuable on/off water flow control valve located in a position with respect to a hollow tube and in a generally vertically disposed arrangement with respect to said sprinkler head assembly, said hollow tube being adapted for generally vertically disposed arrangement when used with said sprinkler head assembly and having a duct for allowing flow of water to the sprinkler head from a subterranean water sprinkler line;

b) said control valve being located in a region of said duct which has increased wall thickness with respect to a remaining portion of said duct; and c) a manually shiftable plug forming part of a control valve means extending into said duct and being angularly located with respect to a central axis of said duct at an angle sufficient to interrupt water flow when said plug is in a first position in said duct to block water flow and reinitiating water flow when said plug is in a second position which is shifted with respect to said first position in said duct and independently of any main control for said water sprinkler line.

42. The adaptive attachment of claim 41 further characterized in that said hollow tube adapted for generally vertically disposed arrangement is a riser tube and said attachment is attached to said hollow tube and which is used in or forms part of said sprinkler head assembly.

43. The adaptive attachment of claim 41 further characterized in that said plug extends into said duct generally perpendicularly to a central axis of said duct for controlling water flow through said duct.

44. An adaptive attachment for use with a sprinkler head enabling the provision of off/on water flow control at said sprinkler head, said adaptive attachment comprising:

a) a manually actuable on/off water flow control valve located in a position with respect to a hollow tube and said hollow tube being adapted for generally vertically disposed arrangement when used with a sprinkler head and having a duct for allowing flow of water to the sprinkler head from a subterranean water sprinkler line; and b) a manually shiftable plug forming part of a control valve means extending into said duct and being generally perpendicularly located with respect to a central axis of said duct at an angle sufficient to interrupt water flow when said plug is in a first position in said duct to block water flow, when said plug is in that second position, and which second position is shifted with respect to said first position in said duct and independently of any main control for said water sprinkler line.

45. An adaptive attachment for use with a sprinkler head enabling the provision of off/on water flow control at said sprinkler head, said adaptive attachment comprising:

a) a manually actuable on/off water flow control valve located in a position with respect to a hollow tube and said hollow tube being adapted for generally vertically disposed arrangement when used with a sprinkler head and having a duct for allowing flow of water to the sprinkler head from a subterranean water sprinkler line;

b) a manually shiftable plug forming part of a control valve means extending into said duct and being generally perpendicularly located with respect to a central axis of said duct at an angle sufficient to interrupt water flow when said plug is in a first position in said duct to block water flow, and reinitiating water flow when said plug is in a second position and which second position is shifted with respect to said first position in said duct and independently of any main control for said water sprinkler line;

c) a recess formed at and communicating with said duct and having an axis generally perpendicular to the axis of said duct; and d) an arcuately shaped end on said plug and being received in and engaging said recess when said plug is in said first position in said duct to block water flow.

46. The adaptive attachment of claim 45 further characterized in that a tool receiving area is formed at an outer end of said plug to cause threaded turning of said plug into and out of said duct.

47. The adaptive fitting of claim 45 further characterized in that said plug has a diametrical size at least as large as that of the duct.

* * * * *